United States Patent [19]

Hellweg et al.

[11] Patent Number: 4,914,990
[45] Date of Patent: Apr. 10, 1990

[54] APPARATUS FOR TRIMMING FLANGED CANS

[75] Inventors: Siegfried Hellweg, Mount Prospect; Jay E. Melind, Arlington Heights, both of Ill.

[73] Assignee: H. L. Fisher Mfg. Co., Inc., Des Plaines, Ill.

[21] Appl. No.: 181,209

[22] Filed: Apr. 13, 1988

[51] Int. Cl.[4] .............................................. B23B 5/14
[52] U.S. Cl. .......................................... 82/54; 82/56; 82/58; 82/82
[58] Field of Search .................. 82/54, 55, 56, 57, 58, 82/82; 83/178, 184, 947, 496, 666

[56] References Cited

U.S. PATENT DOCUMENTS

| 972,828 | 10/1910 | Cosby | 82/56 |
|---|---|---|---|
| 2,232,021 | 2/1941 | Calleson et al. | 82/58 |
| 2,256,306 | 9/1941 | Ziegler | 83/496 |
| 2,298,366 | 10/1942 | Gladfelter et al. | 82/58 |
| 2,702,597 | 2/1955 | Wickwire et al. | 82/82 |
| 3,119,296 | 1/1964 | Foster | 83/622 |
| 3,157,080 | 11/1964 | Hanni | 82/54 |
| 3,359,841 | 12/1967 | Cvacho et al. | 82/82 |
| 3,369,433 | 2/1968 | Johansson | 83/496 |
| 3,400,620 | 9/1968 | Armbruster et al. | 82/47 |
| 3,750,501 | 8/1973 | Miller | 82/82 |
| 3,820,423 | 6/1974 | Miller | 82/82 |
| 3,839,933 | 10/1974 | Paramonoff | 82/82 |
| 3,864,995 | 1/1975 | Langewis | 82/54 |
| 3,878,743 | 4/1975 | Melind | 82/54 |
| 3,894,455 | 7/1975 | Stroobants | 82/56 |
| 3,916,740 | 11/1975 | Stroobants | 82/56 |
| 3,916,746 | 11/1975 | Stroobants | 83/666 |
| 3,994,251 | 11/1976 | Hake et al. | 113/7 R |
| 4,003,279 | 1/1977 | Carmichael et al. | 83/199 |
| 4,046,038 | 9/1977 | West | 82/47 |
| 4,058,037 | 11/1977 | Tashiro et al. | 83/70 |
| 4,111,346 | 9/1978 | Bertolette | 225/96.5 |
| 4,181,050 | 1/1980 | Stroobants | 82/56 |
| 4,283,976 | 8/1981 | Wennerstrom | 83/496 |

Primary Examiner—Donald R. Schran
Attorney, Agent, or Firm—Olson & Hierl

[57] ABSTRACT

The apparatus includes a rotatable headstock trimmer unit including a reciprocating spindle that is rotatable about a horizontal axis and has an annular cutting element secured to one end thereof for engaging the open upper end of an outwardly flanged can, a rotatable tailstock unit including a can base holder that is rotatable about an axis coaxial with the horizontal axis of the trimmer unit and which engages the lower end of the flanged can, and a rotatable cutting element disposed in the path of the reciprocating annular cutting element. The spindle and can base holder rotate about the same horizontal axis, the spindle reciprocates to engage the annular and rotatable cutting elements which cooperate to trim outwardly flanged end portion at the open end of the can.

11 Claims, 5 Drawing Sheets

FIG_5A_

FIG_6_

FIG_7_

APPARATUS FOR TRIMMING FLANGED CANS

TECHNICAL FIELD OF THE INVENTION

The present invention relates in general to can trimming devices and in particular to an apparatus for trimming an outwardly extending flange portion about the open end of a preformed can body.

BACKGROUND OF THE INVENTION

In the manufacture of metal cans, it is conventional practice to form an unfinished can having a cylindrical configuration with a closed bottom portion and a cylindrical side wall that is open at the top end. Unfinished cans may be formed by a variety of processes including impact extrusion and deep drawing processes whereby a generally circular flat metal plate or sheet is first passed through an impact extrusion or deep drawing press where it is formed into a relatively shallow cup. The cup is then passed through an ironing press which elongates the side walls and produces the proper wall thickness of the can.

It is not possible, however, to produce a can having the exact height required or having the upper edge of the side wall exactly square. Can bodies as initially formed are usually of non-uniform height and may have irregular edges at the open top end. Subsequent to the formation of the unfinished container, it is necessary to trim the upper end of the cylinder to produce a can of a fixed height having a smooth upper edge.

It is essential that the upper edge of a can be smooth. The operation employed in many devices of the prior art of forming the flange along the upper edge of the can for attachment of a can lid often produces an uneven or cracked flange perimeter which, of course, can yield an inadequate seal between the lid and the upper edge of the can. Any imperfections such as burrs or cracks will prevent a proper seal between the lid and the can in the flange area. Thus, the forming of a flange having a smooth edge is essential to efficient can making.

The elimination of such imperfections is a particularly troublesome matter in the can making industry. One method of addressing the problems has been to form and trim the flange along the top of a can at the same time that the can is drawn or extruded. A significant drawback to this method is that scrap material from the trimmed can is often difficult to separate from the press and must be removed before the next run can be initiated.

An apparatus is needed to avoid this problem by efficiently trimming the can and discarding the scrap separate from the trimmed can. The irregular edge of the flange must be evenly trimmed without imperfections to produce identical mass-produced cans which can be efficiently sealed.

SUMMARY OF THE INVENTION

The present invention provides an apparatus for rapidly and accurately trimming an outwardly flanged end portion from the open end of a preformed can. By operation of the disclosed shearing arrangement, the flanged edges of trimmed cans are very smooth, and cans are produced rapidly having flanges of a uniform cross-section and diameter. The apparatus positions a flanged can between a reciprocating trimmer spindle of a headstock unit and a spindle of a tailstock unit to trim the excess flange off the can while holding the excess flange away from the can. The apparatus discards the excess flange material after trimming and ejects the trimmed can while the headstock and tailstock units spin in a continuous motion.

The present invention is particularly useful for trimming the flanged, open ends of aluminum cans. However, the invention can also be used to trim the flanged end of any relatively thin-walled tubular member. As used herein, the term "can" means any hollow, elongated element having a generally circular cross-section.

The apparatus of the present invention comprises a reciprocating trimmer spindle and a non-reciprocating can base pad shaft that are rotated about a horizontal axis and are revolved in a circular path. Secured to the end of the trimmer spindle is an annular cutting element which acts in concert with a rotatable cutting element which is disposed in the path of the reciprocating trimmer spindle in a shearing action. A can is positioned on a can base pad which is secured to the end of the can base pad shaft with the can base pad providing a vacuum to secure the bottom of the can. The can flange is positioned between the annular cutting element and the rotatable cutting element with the reciprocating trimmer spindle bringing the cutting elements together to trim the flange.

Because it is essential that the flange be essentially flawless to properly seal the can, any burrs, cracks or other imperfections on the trimmed flange must be avoided. To this end, a pilot is provided having a plurality of biased fingers which fit inside the can during trimming to properly align the can. Also to this end, the reciprocating trimmer spindle is mounted in a ball spline sleeve to reduce the wear on the spindle housing and to ensure proper coaxial alignment of the can even after the apparatus has been used for extended periods of time.

BRIEF DESCRIPTION OF THE DRAWINGS

In the accompanying drawings which form a part of this disclosure.

DETAILED DESCRIPTION OF THE INVENTION

Figure 1:
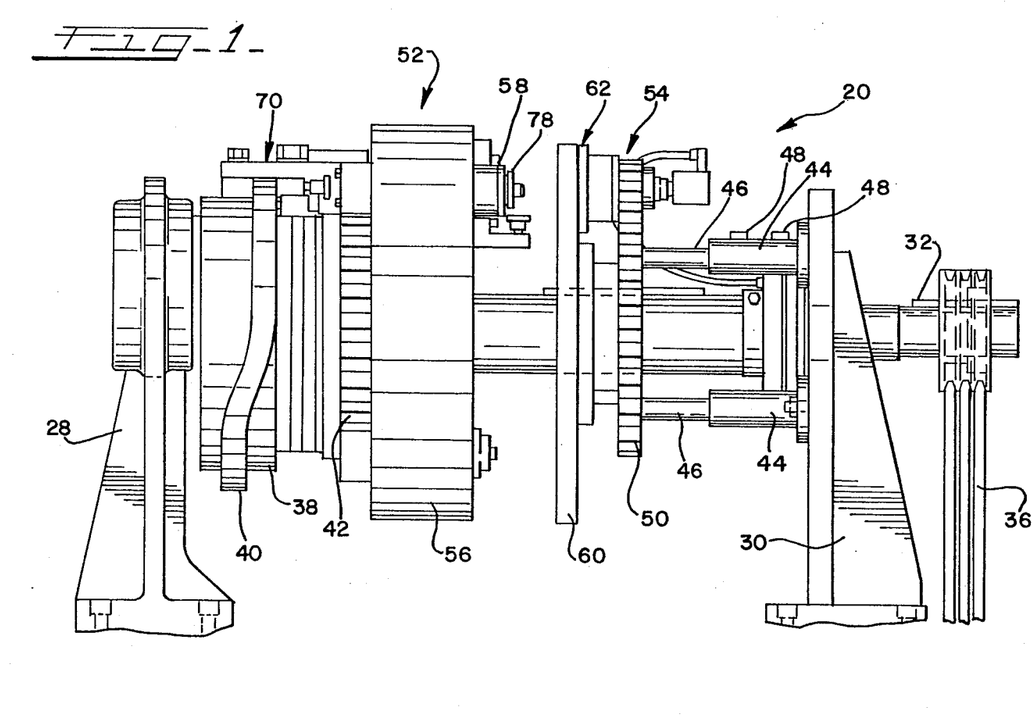
FIG. 1 is a side elevational view of a can trimming apparatus according to the present invention.

Referring to FIG. 1, the can trimming apparatus of the present invention is indicated generally by the reference numeral 20. The apparatus 20 includes a frame 22 which comprises a support assembly 24 and a base platform 26.

Mounted on the base platform 26 are a first upright end frame 28 and a second upright end frame 30. Rotatably mounted in the upper periphery of the first and second upright end frames 28 and 30 is a horizontal main shaft 32. Means for rotating the shaft is provided which, in the described embodiment, includes a drive unit 34 that is mounted on the support assembly 24 and is operatively connected to the main shaft 32 by means of a belt and pulley arrangement 36.

Secured to the first upright end frame 28 is a cam block 38 which supports a raised cam 40. Secured to the cam block 38 is a trimmer driving gear 42. Both the cam block 38 and the trimmer driving gear 42 include central apertures through which the main shaft 32 rotatably extends.

A support housing 44 which slidably supports a plurality of support shafts 46 is secured to the second upright end frame 30. The support housing 44 includes means for affixing the support shafts to the housing which in the described embodiment comprises bolts 48.

A can base driving gear 50 is secured to the plurality of support shafts 46. Thus, the can base driving gear 50 is secured to the second upright end frame 30 by the plurality of support shafts 46 and the support housing 44. Both the can base driving gear 50 and the support housing 44 include central apertures through which the main shaft 32 rotatably extends.

A turret-like headstock assembly 52 and a turret-like tailstock assembly 54 are mounted on the main shaft 32. The headstock assembly 52 includes a main shaft mounted central hub 56 to which are secured three circumferentially spaced trimmer units 58. The tailstock assembly 54 includes a main shaft mounted tailstock plate 60 in which is carried three circumferentially spaced can base holders 62.

Since the three trimmer units and the three can base holders are identical in construction and operation, only one trimmer unit and one can base holder will be described in detail. Preferably, the apparatus includes three, five or six circumferentially spaced trimmer units and a corresponding number of can base holders.

Figure 2:
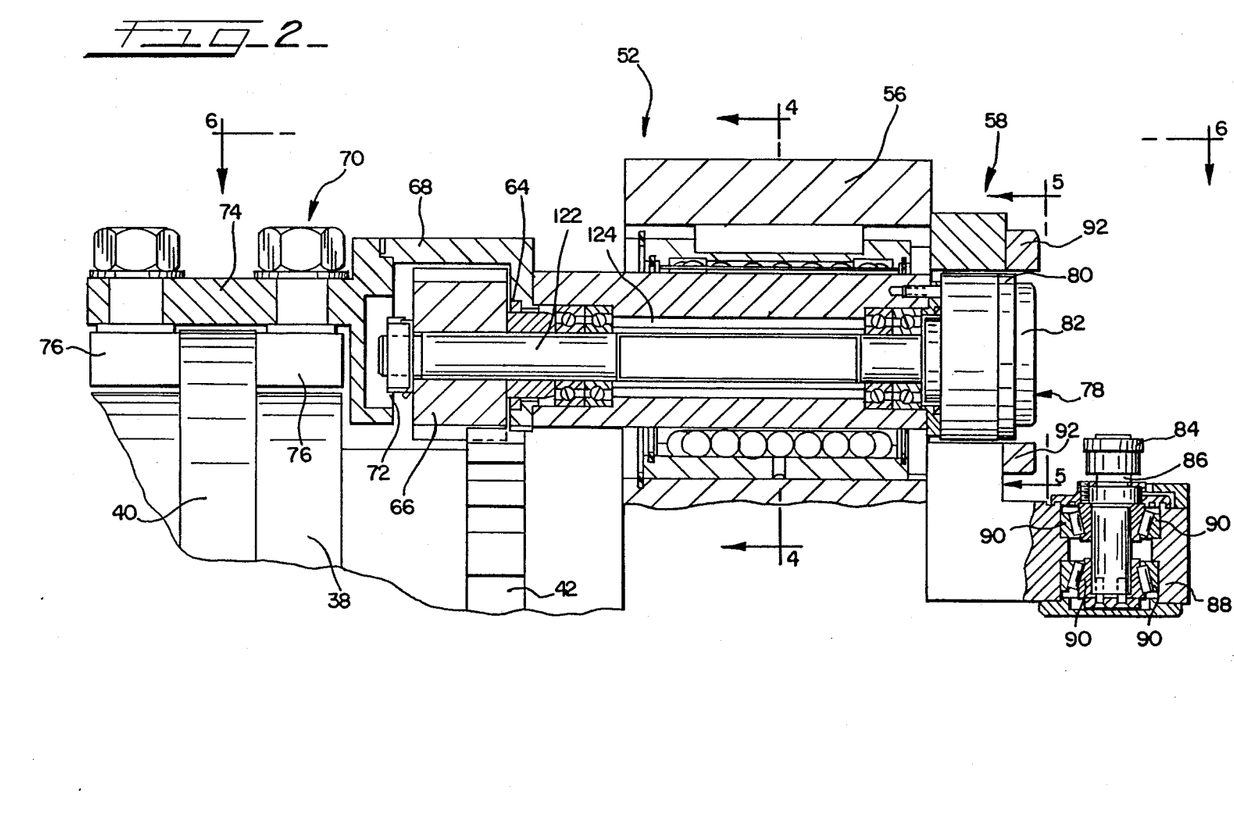
FIG. 2 is a partial sectional view of a headstock trimmer unit.

Referring now to FIG. 2, the headstock assembly 52 is seen in greater detail. The trimmer unit 58 includes a spindle 64 which is rotatably and slidably disposed within the central hub 56.

Mounted on the spindle 64 and contained in gear housing 68 is a trimmer driven gear 66 which is positioned to ride the stationary trimmer driving gear 42 as the main shaft 32 rotates the central hub 56. As the main shaft 32 rotates the central hub 56, the gear assembly causes the spindle 64 to spin about its own axis within the central hub 56.

Attached to one end of the spindle 64 by means of a linear bearing 72 is cam follower means 70. The linear bearing 72 allows for independent rotation of the spindle 64 while maintaining horizontal attachment between the spindle 64 and cam follower means 70. The cam follower means 70 includes a frame member 74 which is secured to the linear bearing 72 and on which is secured a pair of cam followers 76. The cam followers 76 engage the sides of the raised cam 40 as the main shaft 32 rotates the central hub 56 thereby imparting a horizontal reciprocal sliding motion to the spindle 64. The trimmer driven gear 66 is of sufficient width to maintain working contact with the trimmer driving gear 42 as the spindle 64 reciprocates.

Attached to the spindle 64 opposite cam follower means 70 is a trimmer head 78 which includes an annular cutting element 80 having a diameter slightly less than the outside diameter of the flange to be formed on the can. Attached to the annular cutting element 80 is a pilot 82 which extends into the inside of the can during the trimming operation. When the spindle 64 is extended away from the first upright end frame 28 by the cam follower means 70, the annular cutting element 80 cooperates in a shearing action with a rotatable cutting element 84 which is mounted on a shaft 86 supported by housing 88 secured to the central hub 56. The housing 88 includes means for allowing the cutting element shaft 86 to freely rotate. In the preferred embodiment, this means includes the shaft 86 which is freely rotatable within the housing 88 by means of bevel gear assemblies.

When positioned by cam follower means 70, the annular cutting element 80 and the rotatable cutting element 84 are positioned to produce a shearing action on the outwardly extending flange of a can to trim the flange. Cans may be either aluminum or steel with a wall thickness, for example, of between 0.0035 to 0.060 inches (0.089 to 1.53 mm). For satisfactory shearing action, the radial planes of the adjacent edges of the cutting elements may overlap about 0.002 inches (0.051 mm) and the radii of curvature of the adjacent edges of the cutting elements may have a clearance of about 0.0005 to 0.001 inches (0.0127 to 0.0254 mm).

When the spindle 64 is retracted inwardly towards the first upright frame 28 by the cam follower means 70, a stripper ring 92 extends about the outer periphery of the annular cutting element 80. This stripper ring 92 assures the disengagement of the trimmed flange for disposal after shearing.

Figure 3:
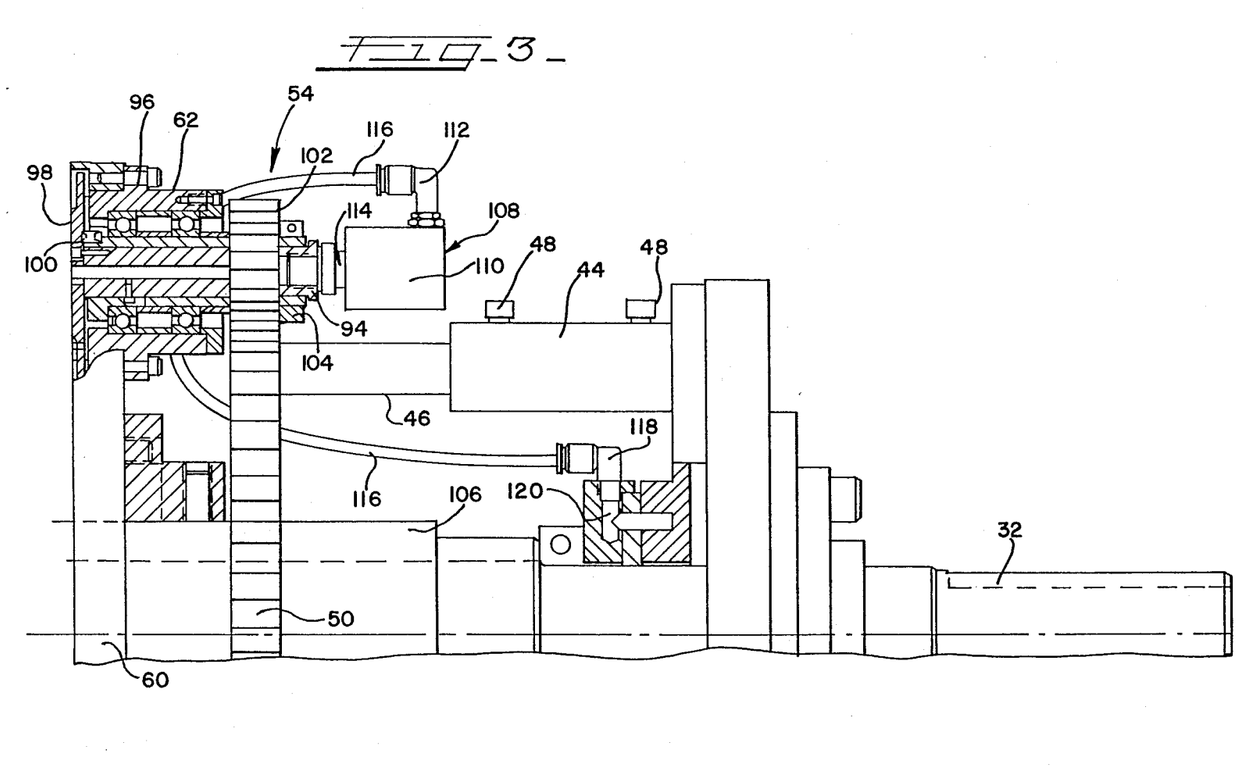
FIG. 3 is a partial sectional view of a tailstock unit.

Referring now to FIG. 3, the tailstock assembly 54 can be seen in greater detail. Contained in the tailstock plate 60 are the can base holders 62. The can base holders 62 include a base pad shaft 94 which is rotatably disposed in base pad housing 96 which is secured to the tailstock plate 60. While the base pad shaft 94 is also capable of horizontally sliding, no reciprocating action is imparted.

At one end, a can base pad 98 is attached to the can base shaft 94 by a biasing means which in the described embodiment is a spring 100. The can base pad 98 thus freely rotates with the can base shaft 94 while maintaining a bias in it horizontal orientation.

Mounted on the can base shaft 94 is a can base driven gear 102. The can base driven gear 102 rides the stationary can base driving gear 50 as the main shaft 32 rotates the tailstock plate 60 thus causing the can base shaft 94 to spin on its own axis in the base pad housing 96.

The can base driven gear 102 is also locked horizontally onto the stationary can base driving gear 50 by a lock ring 104. Thus, when the stationary can base driving gear 50 is adjusted horizontally by loosening the support shaft screws 48 and sliding the support shafts 46, the can base shaft 94 is also adjusted accordingly thereby allowing for cans of different heights. The tailstock plate 60 is thus moved along the main shaft 32 during this adjustment. To maintain the driving relationship between the tailstock plate 60 and the main shaft 32, a raised ridge 106 is provided on the main shaft 32 which is keyed into a groove provided on the tailstock plate 60.

The can base shaft 94 includes a central aperture defined in the center of the shaft 94 which opens to the can base pad 98. Opposite the can base pad 98 the central aperture is attached to a rotary union 108.

The rotary union 108 includes main housing 110, a male elbow 112, and a rotating shaft 114 having a central passage. The rotary union 108 allows free rotation of the rotating shaft 114 while maintaining gaseous communication between the rotating shaft 114 central passageway and the male elbow 112. The can base pad central aperture is specifically connected to the rotary union 108 thus establishing gaseous communication from the can base pad 98 to the male elbow 112.

The male elbow 112 is attached via a flexible hose 116 to a second male elbow 118 attached to a vacuum plate 120. The vacuum plate 120 is attached to the main shaft 32. The vacuum plate 120 is also attached to a source of vacuum (not shown) in conventional manner and thus supplies the can base pad 98 with suction as explained in greater detail below.

Figure 4:
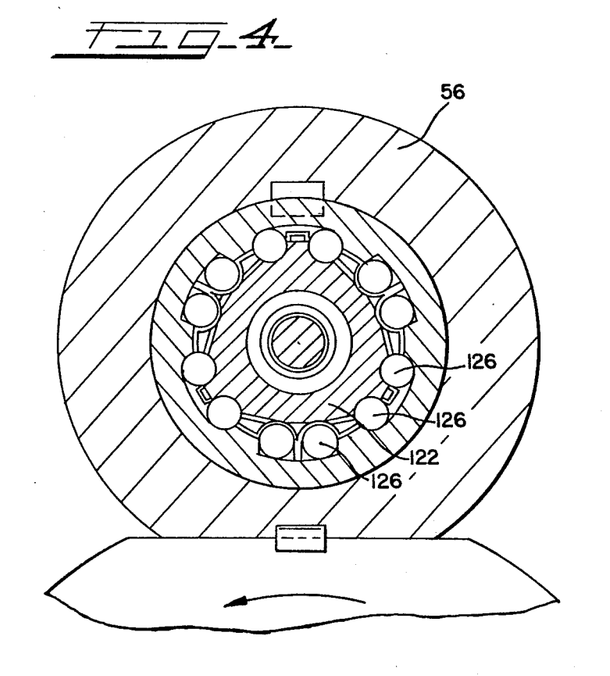
FIG. 4 is a partial cut-away view of the headstock trimmer unit taken along the plane 4—4 of FIG. 2.

Referring now to FIG. 4 in conjunction with FIG. 2, the detail of the spindle 64 as mounted in the central hub 56 is shown. The spindle 64 includes a central shaft 122 which is rotatably mounted in a spindle sleeve 124. On the posterior end of the central shaft 122 is mounted the trimmer driven gear 66 which rides the stationary trimmer driving gear 42 to rotate the central shaft 122. On the anterior end of the central shaft 122 s mounted the trimmer head 78.

In the preferred embodiment, the central shaft 22 is a spline shaft and the spindle sleeve 124 is a ball spline to provide a ball spline assembly. The spline shaft is slidably mounted in the ball spline sleeve by ball bearings 126 which are supported in rows within the sleeve by a rubber cage 127. By use of this ball spline, free reciprocating movement is provided while the wear on the sliding mechanism is reduced to allow for longer use of the apparatus.

Referring again to FIG. 4, each row of load-carrying ball bearings 126A is arranged in the cage 127 parallel and adjacent to and is in communication with a row of non-load-carrying ball bearings 126B. In both the spline shaft and the spindle sleeve, the races on which the ball bearings roll are ground into an R-shape approximate to the radius of the ball bearing. Thus, as the ball bearings have a larger contact area, the bearing assembly provides larger radial capacity.

Moreover, since the load-carrying ball bearings 126A in the cage 127 are arranged at about the same distance from the central shaft 122 as the non-load-carrying ball bearings 126B, the effect of centrifugal force on the ball bearings is minimized and smooth linear motion is obtained.

In particular, according to the present invention, can flanges are trimmed by use of two cutting elements which cooperate in a shearing action. This action provides the clean cut necessary for a smooth edge as long as the can is properly positioned between the cutting elements. But imperfections in the flange edge can occur as a result of the wear associated with movement of the shaft as it reciprocates towards and away from the shearing position. Because of the precision required for a clean shear cut, even the smallest deviation (for example, 0.0001 inch) from the coaxial orientation of the shaft as a result of wear can result in edge imperfections.

Since the preferred bearing assembly maintains a coaxial orientation of the shaft and a precise alignment of the annular cutting element 80 and the rotatable cutting element 84, the apparatus can be operated for extended periods of time without servicing or replacing the central shaft 122 and other components due to wear of the shaft of the sleeve. In fact, it is estimated that if the apparatus includes the preferred bearing assembly instead of a conventional ball bearing bushing assembly, the apparatus can be operated up to twenty times longer without servicing or replacing the central shaft and the ball spline assembly.

Figure 5:
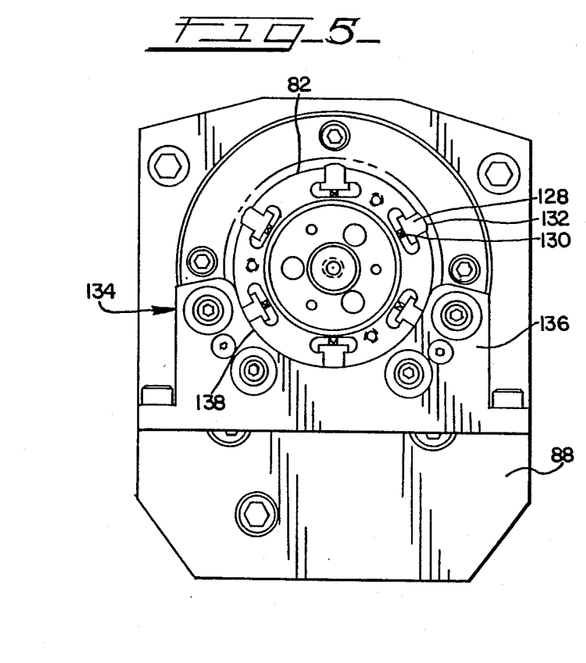
FIG. 5 is a partial end view of the headstock trimmer unit taken along the plane 5—5 of FIG. 2.
Figure 5A:
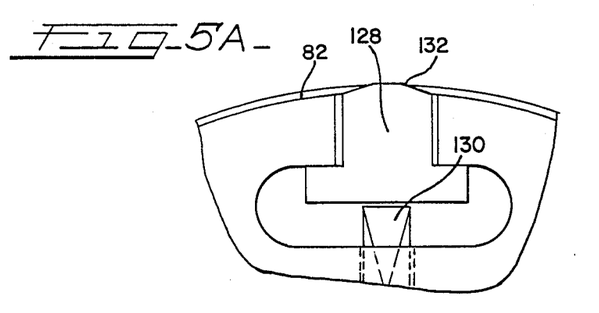

Referring now to FIG. 5, the pilot 82 is shown in detail. The pilot 82 includes a plurality of fingers 128 disposed within the outer periphery of the pilot 82 with each finger 128 being slidably journaled in the pilot 82. Associated with each finger 128 is a bias means or spring 130 to extend the finger 128 outwardly from the pilot 82. When biased outwardly, the finger tips 132 thus extend beyond the outer periphery of the pilot 82 to secure against the interior surface of the can thereby holding and centering the can.

Figure 6:
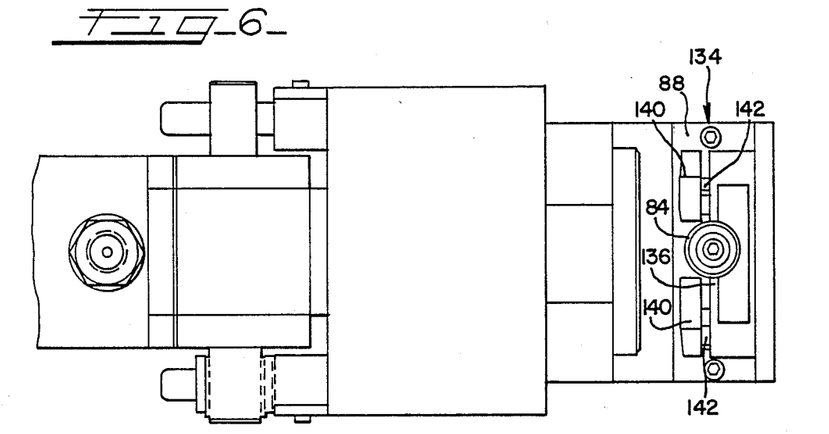
FIG. 6 is a partial top view of the headstock trimmer unit taken along the plane 6—6 of FIG. 2.

FIG. 5 along with FIG. 6 also show the components of the can carrier means 134. The can carrier means 134 includes can carrier housing 136 which is secured to the rotatable cutting element housing 88 and which defines a can receiving pocket 138. The can carrier housing 136 also includes a C-shaped aperture in which the rotatable cutting element 84 is positioned. A plurality of pressure pads 140 are secured to the can carrier housing 126 by bias means which in the described embodiment is a spring biased shaft 142.

Thus, as untrimmed cans are fed into the can trimming apparatus, the cans are dropped into the can carrier means 134 and are held against the can base pad 98 by the applied vacuum. During the trimming cycle, the pressure pads 140 hold the trimmed annular flange away from the can and position it for discharge. After trimming, the trimmed annular flange is discharged in a first discharge chute while the can is held onto the can base pad 98. The main shaft 32 continues to rotate so the trimmed can be discharged into a separate discharge chute.

Figure 7:
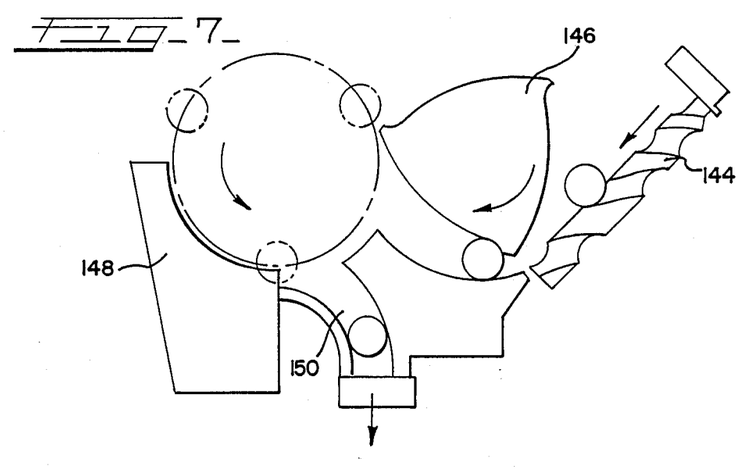
FIG. 7 is a schematic showing the operational sequence of the present apparatus.

Referring to FIG. 7, the sequence of operations for a preferred embodiment of the present device is presented. Initially, cans having a preformed flange are fed into the can trimming apparatus by means such as an infeed spiral 144 in conjunction with a starwheel 146. The cans are positioned in a receiving pocket 138 of the can carrier means 134 and adhere to the can base pad 98 as a result of the vacuum. The flange of the can is positioned between the retracted annular cutting element 80 and the rotatable cutting element 84.

The flange of each can is then individually trimmed as the annular cutting element 80 is brought into a shearing position with the rotatable cutting element 84 by the spindle 64. After trimming, the spindle 64 is retracted and the trimmed flange is fed by gravity into a scrap chute 148 while the trimmed can remained adhered to the can base pad 98 by the vacuum. After the can has rotated past the scrap chute 148, the vacuum is released and the can separates from the can base pad 98. Thereafter, the can is fed by gravity into the can discharge chute 150. As the can is discharged, a second can has just been trimmed while a third has just been fed into the trimming device 20. Thus, in each complete rotation of the main shaft 32, three cans are trimmed.

The apparatus can also be constructed with at least one, but preferably three (as described above), five or six, circumferentially spaced trimmer units 58 and a corresponding number of can base holders 62. An apparatus with three trimmer units can trim at least 300 cans per minute, and an apparatus with five trimmer units can trim at least 500 cans per minute.

It should be understood that various modifications, changes and variations in addition to those herein discussed may be made in the arrangement, operation and details of construction of the elements disclosed herein without departing from the spirit and scope of the invention.

What is claimed is:

1. An apparatus for trimming flanged cans comprising:
   a headstock assembly supported by a shaft and rotatable about a horizontal axis;
   at least one trimmer unit rotatably mounted in the headstock assembly on an axis radially spaced from the rotatable axis of the headstock assembly, the trimmer unit including a ball spline assembly that includes a spindle having an annular cutting element secured to one end thereof, the spindle being axially movable within the trimmer unit;
   a tailstock assembly supported by the shaft and rotatable coaxially with the headstock assembly;
   at least one can base holder rotatably mounted in the tailstock assembly along the same axis as the trimmer unit, the can base holder supporting the lower end of a can so that the open flanged end of the can is positioned between the spindle and the can base holder and is disposed over the annular cutting element;
   means for moving the spindle axially within the trimmer unit;
   a rotatable cutting element positioned in the path of the axially moving spindle; and
   means for rotating the shaft to rotate the headstock and the tailstock assemblies and means for rotating the spindle and the can base holder about the same horizontal axis while the headstock and the tailstock assemblies are jointly rotated;
   whereby, upon axial movement of the spindle, the annular and rotatable cutting elements cooperate to trim a flanged end portion from the open end of a can disposed between the annular and rotatable cutting elements.

2. The apparatus of claim 1 wherein the trimmer unit includes pilot means for insertion within the can as the spindle moves axially within the trimmer unit to position the can relative to the annular and rotatable cutting elements for trimming.

3. The apparatus of claim 1 wherein the trimmer unit includes an annular stripper member axially slidable over the annular cutting element.

4. The apparatus of claim 1 wherein the means for rotating the spindle on its own axis while the headstock and the tailstock assemblies are rotating comprises a stationary driving gear concentric with the axis of rotation of the headstock assembly and a driven gear secured to the spindle to engage the stationary driving gear.

5. The apparatus of claim 1 wherein the means for rotating the can base holder on its own axis while the headstock and tailstock assemblies are rotating comprises a stationary driving gear concentric with the axis of rotate on of the tailstock assembly and a driven gear secured to the can base holder to engage the stationary driving gear.

6. The apparatus of claim 1 wherein the means for moving the spindle axially within the trimmer unit comprises a stationary barrel cam and a cam follower means secured to one end of the headstock assembly, the cam follower means being operatively connected with the barrel cam whereby the spindle can reciprocate within the trimmed unit.

7. The apparatus of claim 1 wherein the spindle is a spline shaft, the ball spline assembly of the trimmed unit further includes a ball spline sleeve and a plurality of bearings, and the spline shaft is slidably supported in the ball spline sleeve by the bearings.

8. The apparatus of claim 1 wherein the rotatable cutting element is freely rotatable about a vertical axis for cooperation with the annular cutting element to trim the flanged open end of a can.

9. The apparatus of claim 1 wherein the headstock assembly includes can support means having at least one can receiving pocket and the can base holder includes bias means at one end thereof for maintaining the axial concentricity of a can within the can receiving pocket as the flanged end portion of the can is disposed between the annular and rotatable cutting elements.

10. The apparatus of claim 1 wherein the can base holder includes a vacuum passageway whereby a vacuum may be established at the can base holder to support a can.

11. The apparatus of claim 2 wherein the pilot includes a plurality of biased fingers at its periphery.

* * * * *

UNITED STATES PATENT AND TRADEMARK OFFICE
CERTIFICATE OF CORRECTION

PATENT NO. : 4,914,990

DATED : April 10, 1990

INVENTOR(S) : Siegfried Hellweg, et al.

It is certified that error appears in the above-identified patent and that said Letters Patent is hereby corrected as shown below:

```
Column 2, line 67, delete the comma after "main";
Column 4, line 40, "it" should read --its--;
Column 5, line 18, "s" should read --is--;
        line 20, "shaft 22" should read --shaft 122--; and
        line 63, "shaft of" should read --shaft or--;
Column 6, line 1, "plot" should read --pilot--;
Claim 5, line 5, "rotate on" should read --rotation--;
Claim 6, line 7, "trimmed" should read --trimmer--;
Claim 7, line 2, "trimmed" should read  --trimmer--.
```

Signed and Sealed this

Seventh Day of May, 1991

Attest:

HARRY F. MANBECK, JR.

*Attesting Officer*   *Commissioner of Patents and Trademarks*